United States Patent
Ruperee

(10) Patent No.: US 9,668,602 B2
(45) Date of Patent: Jun. 6, 2017

(54) COOKING APPLIANCE

(71) Applicant: Whirlpool Corporation, Benton Harbor, MI (US)

(72) Inventor: Prashant Ruperee, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 18 days.

(21) Appl. No.: 14/021,095

(22) Filed: Sep. 9, 2013

(65) Prior Publication Data

US 2015/0072054 A1    Mar. 12, 2015

(51) Int. Cl.
| A47J 27/62 | (2006.01) |
| F24C 7/08 | (2006.01) |
| A23L 5/10 | (2016.01) |

(52) U.S. Cl.
CPC ............... *A47J 27/62* (2013.01); *A23L 5/10* (2016.08); *F24C 7/085* (2013.01); *F24C 7/087* (2013.01)

(58) Field of Classification Search
CPC .... A47J 27/62; A23L 1/01; A23L 5/10; F24C 7/085; F24C 7/087
USPC .......... 426/231; 99/325, 326, 334; 219/494, 219/710, 712, 492, 497
See application file for complete search history.

(56) References Cited

U.S. PATENT DOCUMENTS

| 2,965,015 A | * | 12/1960 | Huchok | ........ A47J 39/02 219/700 |
| 4,363,957 A | | 12/1982 | Tachikawa et al. | |
| 4,433,232 A | | 2/1984 | Tachikawa et al. | |
| 4,831,239 A | * | 5/1989 | Ueda | ............ 219/518 |
| 4,895,067 A | * | 1/1990 | Ohji et al. | ............ 99/325 |
| 5,693,247 A | | 12/1997 | Bu et al. | |
| 5,771,779 A | | 6/1998 | Stein et al. | |
| 5,938,962 A | * | 8/1999 | Adamski | ........... G01J 5/0003 219/497 |
| 6,218,949 B1 | | 4/2001 | Issachar | |
| 6,301,521 B1 | | 10/2001 | Chen et al. | |
| 6,433,693 B1 | | 8/2002 | Mathews, Jr. | |
| 6,630,655 B2 | | 10/2003 | Fukunaga et al. | |
| 6,642,491 B1 | | 11/2003 | Torngren et al. | |
| 8,207,479 B2 | | 6/2012 | Ben-Shmuel et al. | |
| 2009/0321428 A1 | | 12/2009 | Hyde | |

(Continued)

FOREIGN PATENT DOCUMENTS

| EP | 2444734 A2 | 4/2012 |
| FR | 2929823 A1 | 10/2009 |
| JP | 1222113 | 9/1989 |

(Continued)

OTHER PUBLICATIONS

European Patent Application No. 14182358.3 filed Aug. 26, 2014, Applicant: Whirlpool Europe, Srl, European Search Opinion mail date Feb. 23, 2015 re: same.

*Primary Examiner* — Steven Leff
(74) *Attorney, Agent, or Firm* — Price Heneveld LLP

(57) ABSTRACT

A method of heating an item in a cavity of a cooking appliance including the steps of detecting the size of the item at a first time during a cooking cycle and detecting the size of the item at a second time during the cooking cycle. The cooking cycle is then controlled at least partially based on the size of the item at the second time during the cooking cycle. A cooking appliance for carrying out the method is also provided.

9 Claims, 3 Drawing Sheets

(56) References Cited

U.S. PATENT DOCUMENTS

2010/0101317 A1     4/2010    Ashrafzadeh et al.
2010/0231506 A1     9/2010    Pryor

FOREIGN PATENT DOCUMENTS

| JP | 2003090541 A | 3/2003 | |
|----|---|---|---|
| TR | WO 2007141332 A2 * | 12/2007 | .......... A47J 37/0635 |
| WO | 2007054917 A2 | 5/2007 | |

\* cited by examiner

COOKING APPLIANCE

BACKGROUND

The present concept relates to a method of heating an item to prevent boiling over or overcooking of the item, and to a cooking appliance which uses such a heating method.

SUMMARY

A first aspect of the present concept includes a cooking appliance having a cavity for placement of an item to be cooked. A sensor detects the size of the item at multiple times during a cooking cycle and transmits the size to a controller. The controller adjusts the cooking cycle based on the size of the item.

In another aspect of the present concept, a method of heating an item in a cavity of a cooking appliance includes the steps of detecting the size of the item at a first time during a cooking cycle and detecting the size of the item at a second time during the cooking cycle. The method further includes controlling the cooking cycle at least partially based on the size of the item at the second time during the cooking cycle.

Yet another aspect of the present concept includes a method of cooking an item in a cooking appliance including the steps of measuring a physical property of the item at multiple times during a cooking cycle and calculating the rate of change of the physical property of the item. The cooking cycle is controlled based on the rate of change of the physical property during the cooking cycle.

The cooking appliance and methods described in this disclosure aid the user in preventing boil-over of the item in a cooking appliance, by sensing physical properties of the item and controlling the cooking cycle based on these physical properties, rather than relying only on a time setting.

These and other features, advantages, and objects of the present device will be further understood and appreciated by those skilled in the art upon studying the following specification, claims, and appended drawings.

DETAILED DESCRIPTION OF EMBODIMENTS

Figure 1:
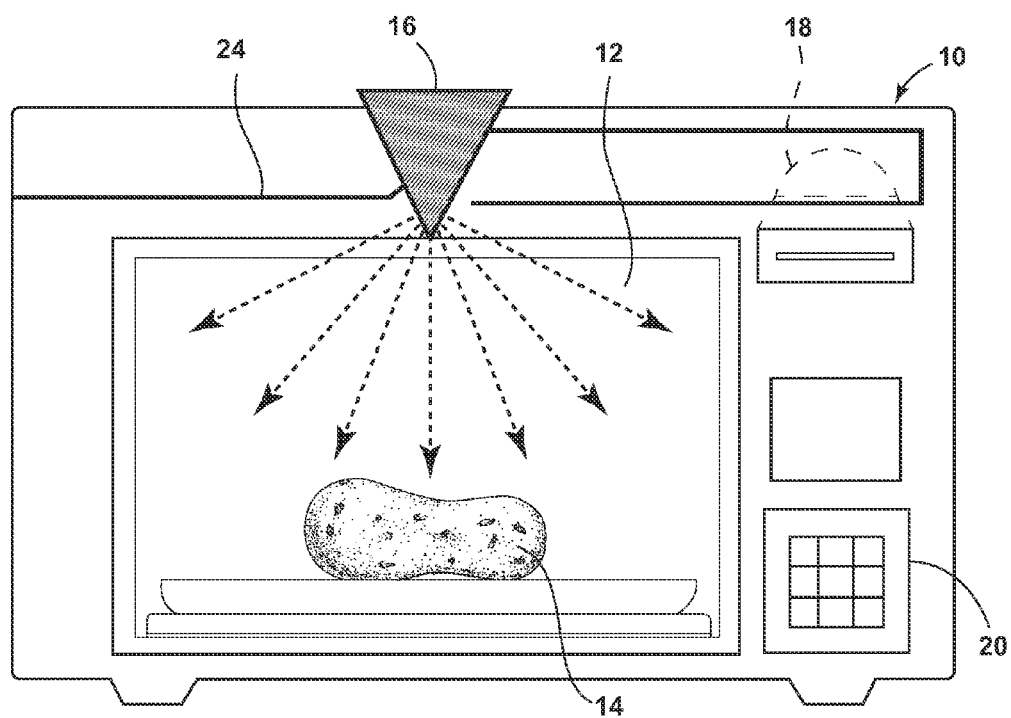
FIG. 1 is a front elevation view of a cooking appliance according to the present invention.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

One embodiment of a cooking appliance 10 according to the present disclosure is shown in FIG. 1. The cooking appliance 10 has a cavity 12 for placement of an item 14 to be cooked. A sensor 16 is positioned to detect physical characteristics of the item 14 while it is in the cavity 12 and during the cooking cycle. The sensor 16 is operably connected with a controller 18. The sensor 16 detects physical characteristics of the item 14 in the cavity 12 at multiple times during a cooking cycle and transmits the information about the physical characteristics to the controller 18. The controller 18 adjusts the cooking cycle based on the physical characteristics of the item 14, as sensed by the sensor 16. The cooking appliance 10 further includes a user input mechanism 20, where the user can input information regarding the cooking cycle, such as the maximum cooking time, the cooking temperature or power level, the type of the food item, any combination of these elements, or other information regarding the cooking cycle.

Figure 2:
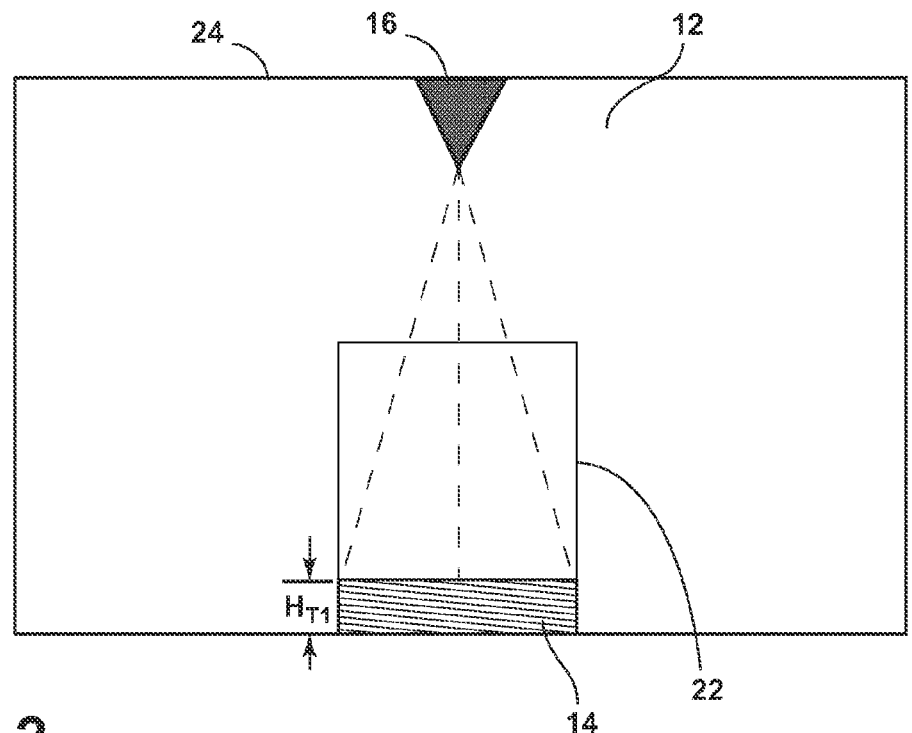
FIG. 2 is a front elevation view of a container of liquid in a cavity of the cooking appliance at the beginning of a cooking cycle.
Figure 3:
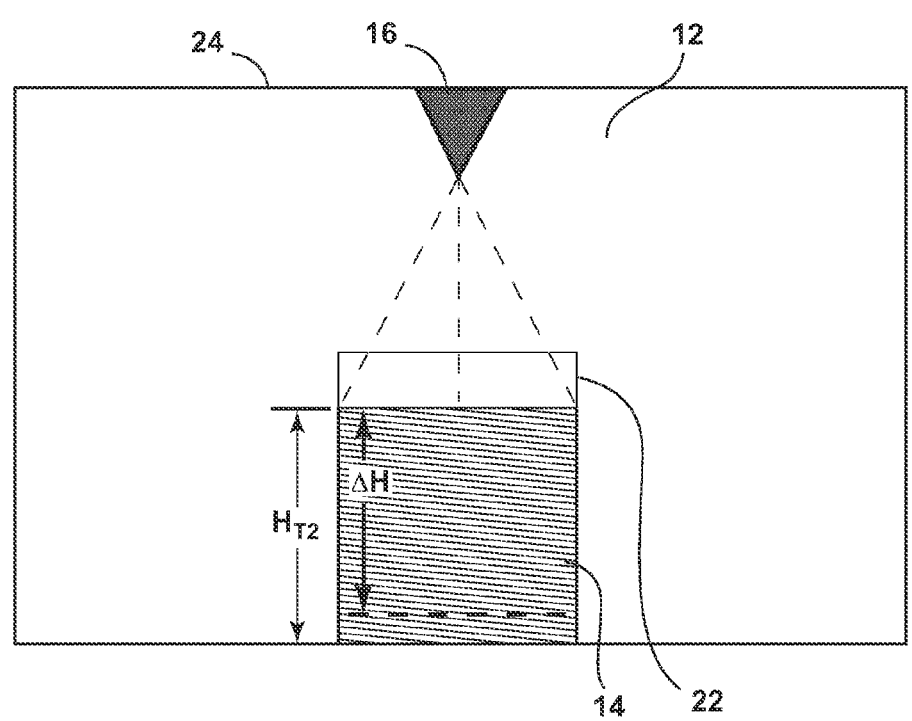
FIG. 3 is a front elevation view of the container of liquid in the cavity of the cooking appliance at the end of the cooking cycle.

As illustrated in the embodiment depicted in FIGS. 2-3, the sensor 16 detects the level of the item 14 in the cavity 12 at a first time (FIG. 2) and a second time (FIG. 3). As the item 14 is heated, it expands. The sensor 16 detects the increase in height of the item 14 (which is a liquid in the embodiment depicted in FIGS. 2-3), and transmits the information regarding the height of the item 14 to the controller 18.

Figure 4:
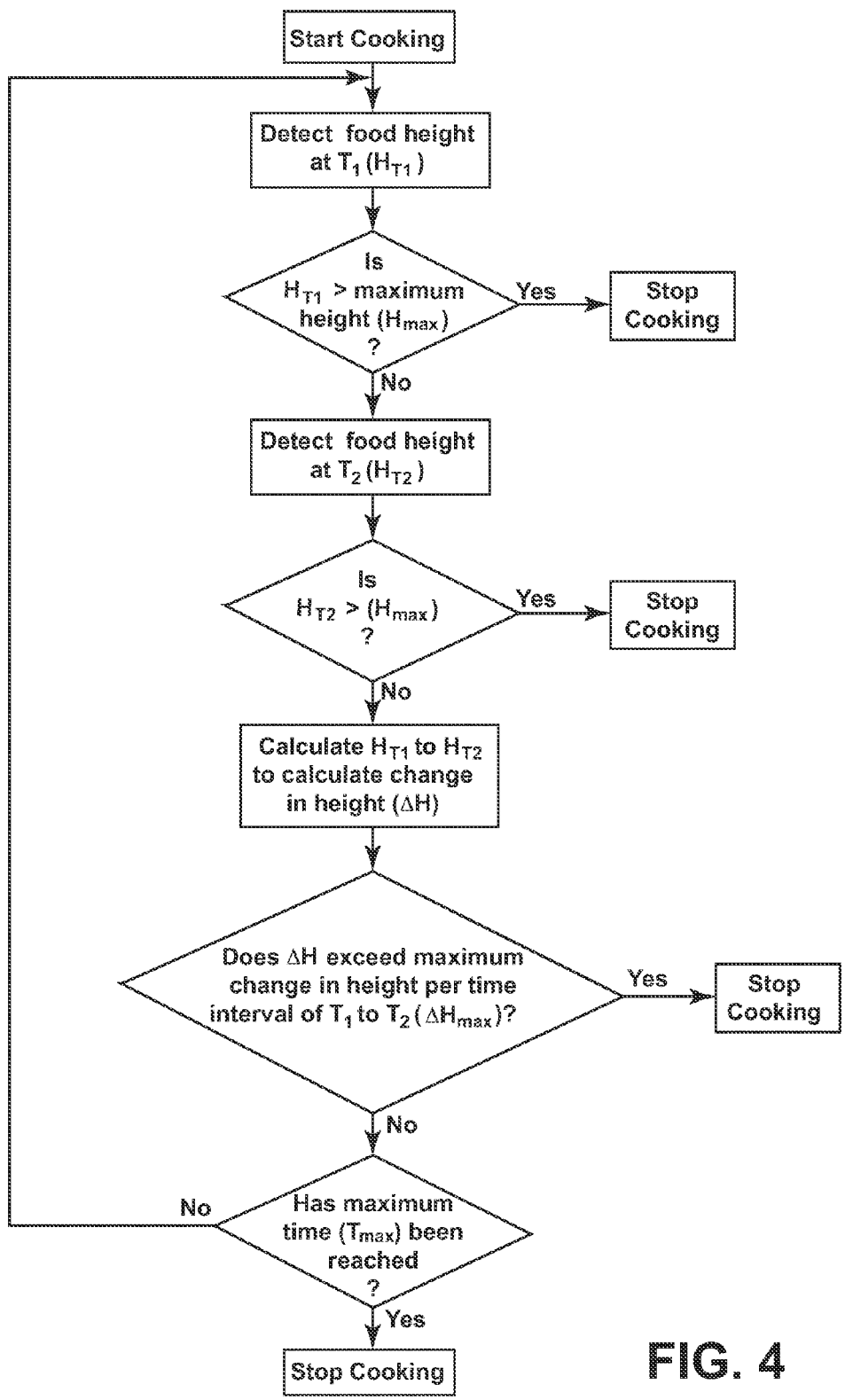
FIG. 4 is a flow diagram of a method of operating the cooking appliance according to the present invention.

As shown in FIG. 4, the controller 18 uses information provided by the sensor 16 to control the cooking cycle. As shown in FIG. 4, to evaluate the cooking cycle in a cooking appliance 10 as depicted in FIGS. 2-3, the sensor 16 detects the height ($H_{T1}$) of the item 14 at a first time ($T_1$). If the height ($H_{T1}$) of the item 14 at the first time ($T_1$) is greater than a predetermined maximum height ($H_{max}$), the controller 18 directs the cooking appliance 10 to stop the cooking cycle. (In alternate embodiments, the controller 18 would instruct the cooking appliance 10 to modify the cooking cycle in a different manner, such as by reducing the cooking power.) If the height ($H_{T1}$) of the item 14 at the first time ($T_1$) is not greater than the predetermined maximum height ($H_{max}$), the sensor 16 detects the height ($H_{T2}$) of the item 14 at a second time ($T_2$). If the height ($H_{T2}$) of the item 14 at the second time ($T_2$) is greater than a predetermined maximum height ($H_{max}$), the controller 18 directs the cooking appliance 10 to stop (or modify) the cooking cycle. If the height ($H_{T2}$) of the item 14 at the second time ($T_2$) is not greater than the predetermined maximum height ($H_{max}$), the controller 18 calculates the change in height ($\Delta H$) of the item 14 between the first time ($T_1$) and the second time ($T_2$). The controller 18 then determines whether the change in height ($\Delta H$) exceeds the predetermined maximum change in height ($\Delta H_{max}$) per the time interval from the first time ($T_1$) to the second time ($T_2$). If the change in height ($\Delta H$) exceeds the predetermined maximum change in height ($\Delta H_{max}$), then the controller 18 directs the cooking appliance 10 to stop (or modify) the cooking cycle. If the change in height ($\Delta H$) does not exceed the predetermined maximum change in height ($\Delta H_{max}$), the controller 18 determines whether the cooking cycle has reached a predetermined maximum time ($T_{max}$) set by the user. In certain embodiments, the maximum height ($H_{max}$) of the item 14 is programmed into the controller 18, including without limitation a maximum height ($H_{max}$)

which is set as a function of the height of the cavity 12. In other embodiments, the maximum height ($H_{max}$) is selected or entered by the user.

If the predetermined maximum time ($T_{max}$) has been reached, the cooking cycle is stopped. If the predetermined maximum time ($T_{max}$) has not been reached, the controller 18 continues to evaluate additional readings of the sensor 16 until at least one of the criteria for ending the cooking cycle has been met.

In some embodiments, the predetermined maximum height ($H_{max}$) of the item 14 is determined and programmed into the controller 18 based on the height of the cavity 12. In alternative embodiments, the maximum height ($H_{max}$) of the item 14 is selected or entered by the user. Additionally, in certain embodiments the predetermined maximum change in height ($\Delta H_{max}$) of the item 14 is calculated with reference to a standard programmed into the controller 18. As an alternative to calculating and basing the criteria on the change in height ($\Delta H$) per the time interval of $T_1$ to $T_2$, embodiments according to the present disclosure may also measure or calculate the velocity or acceleration of the change in height, and include preset criteria for ending the cooking cycle based on these criteria.

In one embodiment, as shown in FIG. 1, the physical characteristic measured by the sensor 16 is the size of the item 14 in the cavity 12. In other embodiments, e.g., as shown in FIGS. 2-3, the physical characteristic measured by the sensor 16 includes the height of the item 14 or its level within a container 22, which may be used as a variable to determine or approximate the size of the item 14. Exemplary sensors 16 suitable to measure the size, height, or level of the item include, without limitation, an IR sensor, a thermal sensor, and a proximity sensor. In certain embodiments the sensor 16 is wireless, and is disposed within the cavity 12. As shown in the embodiments depicted in FIGS. 1-3, the sensor 16 is disposed along a top wall 24 of the cavity 12. In some embodiments, a plurality of sensors 16 may be used to detect the physical characteristic of the item 14. The plurality of sensors 16 may be disposed in a single location or spaced throughout the cavity 12. Such sensors 16 may be used as an "add-on" feature to existing cooking appliances 10 or may be incorporated in the cooking appliance 10 during its manufacture.

In some embodiments, the sensor 16 continuously detects the physical characteristic during the cooking cycle. In alternative embodiments, the sensor 16 may have a delay before beginning to detect the physical characteristic. In still other embodiments, the sensor 16 may detect the physical characteristic periodically (e.g., at defined time intervals).

In order to prevent boiling over or overcooking of the item 14, the controller 18 adjusts the cooking cycle based on the physical characteristic that is sensed. As described above, in the embodiment depicted in FIG. 4, the controller 18 stops the cooking cycle based on the physical characteristic. In another embodiment, the controller 18 reduces the power of the cooking cycle based on the physical characteristic. Reducing the power of the cooking appliance 10 is potentially sufficient to prevent boiling over of an item 14 in the cavity 14 of the cooking appliance 10. Certain embodiments could also combine these features by, for example, reducing the power of the cooking appliance 10 if a first threshold value for the size or the rate of change of size of the item 14 is met and then stopping the cooking appliance 10 if a second threshold value for the size or the rate of change of size of the item 14 is met.

In the embodiments described herein, the controller 18 controls the cooking cycle based at least partially on the size of the item 14 at the second time $T_2$, such as when the size at the second time $T_2$ exceeds a predetermined maximum size. In certain embodiments, the predetermined maximum size would be specified regardless of the type of item 14 being cooked and the initial size (or previously-detected size) of the item 14. In other embodiments, the predetermined maximum size may be calculated for each cooking cycle based on an initial or earlier measurement of the size of the item 14. For example, the cooking appliance 10 may be directed by the controller 18 to stop a cooking cycle if the item 14 reaches 200% of its size at the beginning of the cooking cycle. Alternatively, the cooking appliance 10 may be directed by the controller 18 to stop a cooking cycle if the size of the item is within a specific distance from the top wall 24 of the cavity 12 of the cooking appliance 10. In yet another embodiment, the cooking appliance 10 may stop the cycle upon the first of either of these criteria being met. Based on the user input entered into the cooking appliance 10 (which may include, for example, the identity of the item 14), the cooking appliance 10 may also use different criteria to calculate the predetermined maximum size.

In alternate embodiments, the controller 18 controls the cooking cycle based at least partially on the rate of change in the size of the item 14 from the first time $T_1$ to the second time $T_2$. In such embodiments, the controller 18 would be basing the control of the cooking cycle on both the size of the item 14 at the first time and the size of the item 14 at the second time, as well as the elapsed time between the first time and the second time.

Controlling a cooking appliance 10 in the manner described herein provides an additional variable that can be used to control the cooking cycle in a cooking appliance 10. In current cooking appliances, the cooking power and cooking time are generally set, and then the cooking appliance is started. In order to avoid having the item boil over, the user must either closely observe the item during cooking or set the cycle time at a low value, and add on time if the item is not sufficiently cooked. By detecting the size of the item and stopping the cooking cycle if the size exceeds a maximum value or if the size grows too quickly, the cooking appliance 10 according to the present disclosure is able to provide additional protection to prevent the item 14 from boiling over.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method of heating an item in a cavity of a cooking appliance, comprising the steps of:
    detecting a one-dimensional height of the item at a first time during a cooking cycle;
    detecting the one-dimensional height of the item at a second time during the cooking cycle; and
    controlling the cooking cycle based solely on a difference between the one-dimensional heights of the item at the second and first times during the cooking cycle, wherein the cooking cycle stops when the one-dimensional height of the item at the second time reaches a predetermined maximum one-dimensional height, wherein the predetermined maximum one-dimensional height is a user-selected one-dimensional height of the item to be cooked.

2. The method of claim 1, wherein the one-dimensional height of the item is detected with a sensor, wherein the sensor is chosen from a group consisting of an IR sensor, a thermal sensor, and a proximity sensor.

3. The method of claim 1, wherein the step of detecting the one-dimensional height of the item includes sensing the one-dimensional height of the item within the cavity.

4. The method of claim 1, further comprising the step of:
    comparing the one-dimensional height of the item at the first time to the one-dimensional height of the item at the second time; and
    controlling the cooking cycle based solely on the one-dimensional height of the item at the first time and the one-dimensional height of the item at the second time.

5. The method of claim 4, wherein the step of controlling the cooking cycle includes calculating a rate of change in the one-dimensional height of the item from the first time to the second time, and controlling the cooking cycle based on the rate of change in the one-dimensional height of the item from the first time to the second time.

6. The method of claim 5, wherein the step of controlling the cooking cycle includes stopping the cooking cycle when the item reaches a predetermined maximum rate of change.

7. The method of claim 1, wherein the predetermined maximum one-dimensional height is calculated based upon the one-dimensional height of the item at the first time during the cooking cycle.

8. A method of cooking an item in a cooking appliance, comprising the steps of:
    measuring a one-dimensional physical property of the item at multiple times during a cooking cycle, wherein the one-dimensional physical property is a height of the item;
    calculating a velocity of a rate of change of the one-dimensional physical property of the item; and
    controlling the cooking cycle based solely on the velocity of the rate of change of the one-dimensional physical property during the cooking cycle, wherein the cooking cycle stops when the velocity of the rate of change of the one-dimensional physical property during the cooking cycle exceeds a controller-predetermined maximum velocity.

9. The method of claim 8, wherein the height is measured by a sensor, and wherein the sensor is chosen from a group consisting of an IR sensor, a thermal sensor, and a proximity sensor.

* * * * *